3,036,959
PROCESS FOR PREPARING POLY-β-HYDROXY-
BUTYRIC ACID
James Noel Baptist, Laurel, Md., assignor to W. R. Grace
& Co., New York, N.Y., a corporation of Connecticut
No Drawing. Filed Sept. 26, 1960, Ser. No. 58,154
20 Claims. (Cl. 195—47)

This invention relates to the synthesis of poly-β-hydroxybutyric acid, a polymer consisting of repeating units of the formula [—CH(CH$_3$)CH$_2$C(O)O—]$_n$. In one particular aspect it is a method for obtaining greater yields of poly-β-hydroxybutyric acid without significantly degrading the polymer. In another particular aspect it is a method for obtaining a polymer with valuable properties as a plastic.

In summary, the invention in its broadest aspect is directed to extracting poly-β-hydroxybutyric acid from bacteria containing this polyester, by means of pyridine.

Poly-β-hydroxybutyric acid produced by this novel method is a translucent, plastic-like polyester which can be utilized in several ways. It is easily cast into a film or molded into articles by conventional methods. It is also useful for surface coatings and as a fiber.

It is especially useful in the field of medicine. Medical sutures made of poly-β-hydroxybutyric acid need not be removed since they eventually decompose to naturally occurring substances without harm to the patient. Films of poly-β-hydroxybutyric acid can be used to support injured arteries and blood vessels until the tissues heal.

Poly-β-hydroxybutyric acid can be synthesized by various bacteria under suitable conditions. The choice of bacteria depends not only on one capable of forming this polyester, but also on one which can effect the desired biochemical change within a relatively short time and can produce the highest yield with a minimum of attention.

The families where this polyester is known to be a major constituent include Athiorhodaceae, Pseudomonadaceae, Spirillaceae, Rhizobiaceae, Bacillaceae and Azotobacteriaceae. *Rhodospirillum rubrum* of the Athiorhodaceae family and *Bacillus megaterium* of the Bacillaceae family are notable examples.

Cultures of bacteria used in established processes are usually available from scientific culture collections such as the A.T.C.C. (American Type Culture Collection, Georgetown University, School of Medicine, Washington, D.C.), the collections of various universities and the U.S. Department of Agriculture.

The individual bacteria cells are physiologically independent. A thin membrance determines the outside boundary of the cell and constitutes the cell wall. Within the cell is a colloidal solution known as cytoplasm. Some of the granules suspended in the cytoplasm have been found to be composed largely of poly-β-hydroxybutyric acid. Under appropriate conditions unusually large amounts of this polyester can be built up in the cells.

There are two processes presented in the literature for isolating poly-β-hydroxybutyric acid from bacteria. In one process the polyester is extracted from the dried bacterial cells with chloroform. Although this method gives a polymer with useful properties as a plastic, the yield is much too low for this process to be of any value. In order to increase product yields, a second method was devised whereby the dried bacterial cells are first digested in sodium hypochlorite and the resulting insoluble residue, crude poly-β-hydroxybutyric acid, is extracted with chloroform. The product obtained by this second method is so degraded that it is useless as a plastic.

It is, therefore, an object of this invention to provide an improved process for producing greater product yields of poly-β-hydroxybutyric acid without significantly degrading the polymer than methods heretofore employed.

It is a further object of this invention to produce a polymer with valuable properties as a plastic.

It has been found that yields are greatly increased by using pyridine instead of chloroform to extract poly-β-hydroxybutyric acid.

It has also been found that the baceteria cells are sufficiently broken up by dispersing them directly in acetone.

To carry out this improved process, large quantities of appropriate bacteria are grown in a suitable nutrient medium. The bacteria are collected by known means, e.g., centrifugation, and then the mass of wet cells is dried by suitable means, for example, by dispersing them in acetone. A cells:acetone weight ratio of 1:1 to 10 is suitable.

In addition to breaking up the cell walls, the acetone removes water and dissolves lipids and other materials which would otherwise contaminate the product. The use of acetone at this stage makes the polyester readily extractable.

The acetone is removed and the bacterial residue is easily dried to a powder. The powder is treated with pyridine at a temperature of at least 40° C., or more preferably, by refluxing for 5–30 minutes, to dissolve the poly-β-hydroxybutyric acid. Suitably, a residue:pyridine weight ratio of 1:10 to 100 is used.

The polyester solution is filtered and the polyester is recovered from the filtrate by various methods. The polyester can be recovered by evaporating or cooling the solution. Suitable precipitants such as petroleum ether and petroleum hydrocarbons in general can be used. A means that is particularly suitable for precipitating the polyester from the pyridine solution, and which is a preferred embodiment of this invention, is to add ether to the pyridine solution. An ether:pyridine ratio of about 3:1 is suitable.

Other methods of recovering the polyester include adding water, alcohol and non-polar solvents such as benzene to the pyridine solution. Generally, liquids miscible in pyridine will precipitate the polyester.

This invention can be varied without departing from its scope. For example, means other than acetone can be used to dry and to break up the bacterial cell mass sufficiently for extraction of the polyester. This can be done by placing the bacterial cell mass under a vacuum or in an oven at about 105° C. in the absence of oxygen before dispersing it in hot pyridine. Mixing the cell mass with an antioxidant and placing it in an oven at about 105° C. is another method.

An alternative process of extracting the polyester is also possible. The dried mass of bacterial cells is intially dispersed in hot chloroform one or more times for primary dissolution of the polyester. For further dissolution of poly-β-hydroxybutyric acid, the insoluble bacterial residue separated from the chloroform solution is dispersed in hot pyridine one or more times. The polyester is then precipitated from both chloroform and pyridine polyester solutions. This technique of sequential extractions is described more fully in Example III below.

The following examples will serve to illustrate the invention:

*Example I*

A nutrient medium having the following composition was prepared:

| | | |
|---|---|---|
| Glucose | g | 240.0 |
| Mineral solution [1] | ml | 600.0 |
| Yeast extract | g | 9.0 |
| Water | ml | 12000.0 |

[1] Mineral solution: 10.0 g. (NH$_4$)$_2$SO$_4$, 10.0 g. KH$_2$PO$_4$, 18.9 g. Na$_2$HPO$_4$.7H$_2$O, 2.0 g. MgSO$_4$, 0.2 g. CaCl$_2$, 0.06 g. FeCl$_3$, 1000.0 ml. H$_2$O.

The nutrient medium was autoclaved and allowed to cool. A 500 ml. inoculum of *Bacillus megaterium* (A.T.C.C. #8245) from a 24-hour old culture was added to the nutrient medium. The medium was continuously aerated at room temperature for about sixty hours with filtered air at the rate of about 200 to 500 cc. per minute. Aeration was vigorous enough to mix the nutrient medium continuously. At the end of the incubation period, the cells were harvested by centrifugation and mixed with 200 ml. of acetone. The acetone was filtered off and the bacterial residue was added to another 200 ml. of acetone and allowed to stand for about 15 hours. The acetone was then removed and the bacterial residue was air dried until the odor of acetone disappeared. The dried residue weighed 11.4 g. (herein called Residue A).

*Example II*

0.612 g. of Residue A from Example I was added directly to 50 ml. of pyridine, refluxed for 10 minutes and filtered. 200 ml. of ether was added to the clear filtrate to precipitate the polyester. After three hours the solution was chilled, filtered and the polyester precipitate was dried in a vacuum desiccator. The dried product weighed 0.1145 g.

In order to determine whether digestion of the cells with sodium hypochlorite is necessary, 0.50 g. of Residue A from Example I was added to 10 ml. sodium hypochlorite solution and digested at 30° C. for 30 minutes. The precipitate was collected by centrifugation, washed with water and centrifuged again. It was dried for about 15 hours in a vacuum desiccator. The dried residue, weighing 0.267 g., was added to 50 ml. of pyridine and the same procedure for extracting the polyester was followed as described above. The dried polyester product weighed 0.1137 g.

In one embodiment of the invention, prior art procedures (e.g., chloroform extraction) can be supplemented with one or more subsequent pyridine extractions, as described in the following example.

*Example III*

10.3 g. of Residue A obtained in Example I were added to 100 ml. of chloroform and refluxed for 15 minutes to give "Residue B," about 10 g., and a clear filtrate. The solution was filtered, 300 ml. of ether was added to the clear filtrate and allowed to stand overnight. The solution was filtered and the polyester product dried in a vacuum desiccator overnight. The dried product weighed 0.2757 g. and melted at about 176° C. This yield, 0.2757×100÷10.3, or 2.7%, compares with the 18.7% yield obtainable by the process of this invention as shown in the preceding example. Residue B was added to 100 ml. hot pyridine (about 110° C.) and refluxed for 15 minutes. The solution was filtered and 300 ml. ether was added to the filtrate to precipitate the polyester. The solution was filtered and the precipitate was mixed with 100 ml. ether. The solution was filtered and the product dried in a vacuum desiccator. The dried product weighed 1.2092 g. and also melted at about 176° C.

The residue, which did not dissolve in the pyridine, about 8.8 g., was added again to 100 ml. of hot pyridine (about 110° C.) and refluxed for 15 minutes. The solution was filtered and 300 ml. ether was added to the filtrate. The solution was chilled and filtered. The precipitate was dried overnight in a vacuum desiccator and yielded 0.6244 g. The total yield of poly-β-hydroxybutyric acid, therefore, was 2.1096 g., or 2.1096×100÷10.3=20.5%

Only .2757 g. had been produced by chloroform whereas an additional 1.8336 g. had been produced by pyridine.

*Example IV*

To test the high temperature stability of poly-β-hydroxybutyric acid produced by this novel method, three samples of equal weight (0.0605 g. each) were placed under nitrogen in individual test tubes. Sample 1 was used as a control. Sample 3 contained 1.3 mg. of antioxidant, 2,6-ditertiarybutyl-4-methyl-phenol.

Samples 2 and 3 were placed in an oil bath and heated for 20 minutes at 185° C. which is just above the melting point of poly-β-hydroxybutyric acid. The heated products were fused and brown in color. They dissolved readily in a solution composed of two parts of methylene chloride to one part of pyridine. These solutions were used to determine the intrinsic viscosities listed below.

Sample 1, the control sample, dissolved unusually slowly in hot pyridine. The same proportion of methylene chloride as above was added to determine the intrinsic viscosity.

| Sample No. | Weight | Intrinsic Viscosity |
|---|---|---|
| 1 | 0.0605 g. (Control) | 4.4 |
| 2 | 0.0605 g. | 0.715 |
| 3 | 0.0605 g. (1.3 mg. 2,6-ditertirary-butyl-4-methyl-phenol added). | 0.632 |

*Example V*

A nutrient medium having the following composition was prepared:

| | | |
|---|---|---|
| Phosphate buffer [1] | ml | 320.0 |
| Mixed mineral solution [2] | ml | 320.0 |
| Sodium acetate | g | 22.0 |
| Yeast extract | g | 16.0 |
| Water | l | 15.4 |

[1] Phosphate buffer: 46.0 g. KH$_2$PO$_4$, 86.4 g. Na$_2$HPO$_4$·7H$_2$O, 2000 ml. H$_2$O.
[2] Mixed mineral solution: 10 g. nitrilotriacetic acid dissolved in H$_2$O and neutralized with a solution of 7.3 g. KOH (pH about 8). Add 14.45 g. MgSO$_4$, 2.5 g. CaCl$_2$, 9.2 mg. (NH$_4$)$_6$Mo$_7$O$_{24}$·4H$_2$O, 99 mg. FeSO$_4$·7H$_2$O, 5.0 ml. standard trace metal solution. (See note below.) Add H$_2$O to give 1 l. final volume and adjust to pH 6.5–7.0.

NOTE.—Standard trace metal solution: 0.10G g. CoCO$_3$, 1.14 g. MnCO$_3$, 5.21 g. ZnCl$_2$, 5.0 g. FeSO$_4$·7H$_2$O, 0.39 g. CuSO$_4$·5H$_2$O, 0.117 g. H$_3$BO$_3$, 2.50 g. versene acid, several drops H$_2$SO$_4$, 1000.0 ml. H$_2$O.

The nutrient medium was autoclaved and allowed to cool. An 80 ml. inoculum of *R. rubrum* (C. B. van Niel strain 1.1.1.) from a seven day old culture was added to the nutrient medium. Two 150-watt floodlights were focused on the culture and the temperature was maintained at about 30° C. The medium was continuously aerated with a stream composed of 5% N$_2$ and 95% CO$_2$.

After six days the stream of N$_2$ and CO$_2$ was stopped and the culture was aerated with H$_2$ for six hours. The pH rose from 7 to 9. The H$_2$ was stopped and aeration with N$_2$ and CO$_2$ was resumed for 18 hours and then stopped. Aeration with H$_2$ was resumed and after six hours the H$_2$ was stopped. The cells were harvested by centrifugation and weighed 37.6 g.

*Example VI*

3.4 g. of the *R. rubrum* cells obtained in Example V were mixed with acetone and allowed to stand for three hours. The acetone was then filtered off and the residue dried until the odor of acetone was gone. The dried sample weighed 1.05 g. 140 mg. of this material was added to 25 ml. of hot pyridine (about 110° C.) and refluxed for 15 minutes. The hot pyridine solution was filtered and 100 ml. ether was added to the clear filtrate and left overnight. The solution was filtered off and the resultant poly-β-hydroxybutyric acid was dried in air overnight. The dried sample weighed 0.0247 g. Based on the 37.6 g. bacterial mass obtained in Example V this meant a total yield of 2.05 g. of polyester, or about twice the amount that can be obtained when chloroform is used instead of pyridine.

Example VII

R. rubrum cells obtained in Example V were used in the following tests which illustrate the effects of different solvents.

| Sample No. | R. rubrum Cells | Solvent | Time, min. | Temp. | Yield, g. | Intrinsic Viscosity |
|---|---|---|---|---|---|---|
| 1 | Dried (1.7 g.).[1] | 50 ml. Pyridine. | 15 | Reflux | 0.282 | 1.30 |
| 2 | ----do.[1] | 50 ml. CHCl₃. | 30 | ---do--- | 0.155 | 3.05 |

[1] From 5.0 g. of wet cells.

Example VIII

About one gram of poly-β-hydroxybutyric acid produced by the preferred embodiment of this process, e.g. dispersing the wet bacterial mass in acetone and extracting the bacterial residue with pyridine, was dissolved in about 100 ml. methylene chloride. The solution was filtered to remove any impurities which may have been present. The clear filtrate was placed in a flat dish and allowed to dry slowly in the air. After all the solution had evaporated, a thin translucent film remained. The film was easily peeled from the dish.

To determine the type of product obtained when the bacterial mass is initially digested in sodium hypochlorite solution as described in Example II, one gram of poly-β-hydroxybutyric acid produced by this process was dissolved in about 100 ml. methylene chloride. The same procedure was followed as described above. After all the solution had evaporated, a greyish-white material remained which crumbled easily.

Example IX 5 g. of R. rubrum cells produced in the same manner as described in Example VI, were mixed with 4 mg. of 2,6-ditertiarybutyl-4-methyl-phenol and dried in an oven at 105° C. The dried sample, weighing 1.72 g., was dispersed in 100 ml. hot pyridine (about 110° C.) refluxed for 15 minutes and filtered. 200 ml. of ether was added to the clear filtrate to precipitate the polyester and allowed to stand for three hours. The solution was then chilled, filtered and the polyester precipitate was dried in a vacuum desiccator. The dried product weighed 0.3 g.

Example X

The procedure of Example IX was followed except that the bacterial cell mass was dried in an oven at 105° C. for six hours in the absence of oxygen before refluxing it with pyridine.

Example XI

The procedure of Example IX was followed except that the bacterial cell mass was dried in a vacuum (650 mm. Hg) for 16 hours before refluxing it with pyridine.

Example XII

The following data, taken at 23° C., illustrates some of the physical properties of poly-β-hydroxybutyric acid film determined by known A.S.T.M. procedures. The particular sample tested here was isolated from R. rubrum.

Tensile strength _____ p.s.i__ 5520
Tensile modulus _____ p.s.i__ 344,000
Elongation at failure _____ percent__ 2.2

I claim:

1. In the process of preparing poly-β-hydroxybutyric acid by the growth of bacteria in a culture medium whereby the bacteria acquire deposits of said polyester within their cell walls followed by recovery of the polyester-bearing bacteria and the solvent extraction of the polyester from the bacteria, the improvement comprising the steps of dispersing the polyester-bearing bacteria in acetone to break up the bacteria cell walls and to remove lipids and water therefrom, separating the thus-treated bacterial residue and dispersing it in pyridine to dissolve poly-β-hydroxybutyric acid from the bacterial residue, separating the insoluble bacterial residue from the pyridine solution, and recovering the poly-β-hydroxybutyric acid from the pyridine solution.

2. The method according to claim 1 in which the poly-β-hydroxybutyric acid is recovered from the pyridine solution by adding liquids miscible with pyridine thereto to precipitate the polyester.

3. The method according to claim 1 in which the poly-β-hydroxybutyric acid is recovered from the pyridine solution by adding ether thereto to precipitate the polyester.

4. The method according to claim 1 in which the bacteria is selected from the group of families consisting of athiorhodaceae, Pseudomonadaceae, Spirillaceae, Rhizobiaceae, Bacillaceae and Azotobacteraceae.

5. The method according to claim 4 in which the bacterium is *Bacillus megaterium*.

6. The method according to claim 4 in which the bacterium is *Rhodospirillum rubrum*.

7. The method according to claim 1 in which the weight ratio of bacteria:acetone is substantially 1:1 to 10.

8. The method according to claim 7 in which the weight ratio of bacterial residue:pyridine is substantially 1:10 to 100.

9. The method according to claim 8 in which the extraction with pyridine is carried out under reflux for about 5–30 minutes.

10. The method according to claim 9 in which ether is added to the refluxed pyridine solution at room temperature in an ether:pyridine weight ratio between about 1:1 and 10:1, whereby poly-β-hydroxybutyric acid is precipitated, followed by recovering and drying the said precipitate.

11. The process of recovering poly-β-hydroxybutyric acid from a bacterial cell mass containing this polyester which comprises adding the bacterial cell mass to pyridine to extract the poly-β-hydroxybutyric acid, separating the pyridine solution of polyester from the cell residue, and recovering the polyester product from the pyridine.

12. The process of preparing poly-β-hydroxybutyric acid which comprises growing appropriate bacteria in a culture medium under conditions conducive to the formation of poly-β-hydroxybutyric acid, adding the bacterial cell mass to hot pyridine to extract the poly-β-hydroxybutyric acid, separating the pyridine solution of polyester from the cell residue, and recovering the polyester product from the pyridine.

13. The process of recovering poly-β-hydroxybutyric acid from a bacterial cell mass containing this polyester which comprises adding the bacterial cell mass to chloroform for a primary dissolution of the poly-β-hydroxybutyric acid, separating the chloroform solution of polyester from the cell residue, adding the insoluble cell residue to pyridine for further dissolution of the poly-β-hydroxybutyric acid, separating the pyridine solution of polyester from the cell residue, and recovering the polyester product from the chloroform and pyridine solutions of polyester.

14. The process of recovering poly-β-hydroxybutyric acid from a bacterial cell mass containing this polyester which comprises drying the bacterial cell mass, dispersing it in pyridine to extract the poly-β-hydroxybutyric acid, separating the solution of polyester from the cell residue, and recovering the polyester product from the pyridine.

15. The method according to claim 14 in which the bacterial cell mass is dried by extracting it with acetone.

16. The method according to claim 14 in which the bacterial cell mass is dried in an oven at 105° C. in the absence of oxygen.

17. The method according to claim 14 in which the bacterial cell mass is mixed with an antioxidant and dried in an oven at 105° C.

18. The method according to claim 14 in which the bacterial cell mass is dried under a vacuum.

19. The process of preparing poly-β-hydroxybutyric acid from *Rhodospirillum rubrum* which comprise inoculating *Rhodospirillum rubrum* into a culture medium comprised of 320 ml. phosphate buffer composed of 46.0 g. $KH_2PO_4$, 86.4 g. $Na_2HPO_4 \cdot 7H_2O$, 2000 ml. $H_2O$; 320 ml. mixed mineral solution composed of 10 g. nitrilotriacetic acid dissolved in $H_2O$ and neutralized with a solution of 7.3 g. KOH and adding 14.45 g. $MgSO_4$, 2.5 g. $CaCl_2$, 9.2 mg. $(NH_4)_6Mo_7O_{24} \cdot 4H_2O$, 99 mg. $FeSO_4 \cdot 7H_2O$, 5.0 ml. standard trace metal solution, enough $H_2O$, to give 1 l. total adjusting pH 6.5 to 7.0, the standard trace metal solution being composed of 0.106 g. $CoCO_3$, 1.14 g. $MnCO_3$, 5.21 g. $ZnCl_2$, 5.0 g. $FeSO_4 \cdot 7H_2O$, 0.39 g. $CuSO_4 \cdot 5H_2O$, 0.117 g. $H_3BO_3$, 2.50 g. versene acid, several drops $H_2SO_4$, 1000.0 ml. $H_2O$; aerating the inoculated culture medium with a nitrogen:carbon dioxide mixture under illumination, stopping the nitrogen:carbon dioxide flow and aerating with hydrogen under illumination; harvesting the bacterial cell mass; dispersing the bacterial cell mass in acetone to break up the bacterial cell walls and to remove lipids and water therefrom; separating the thus treated bacterial mass and dispersing it in hot pyridine to extract poly-β-hydroxybutyric acid; separating the polyester solution from the cell residue; adding ether to the polyester solution to precipitate the polyester and recovering the polyester product.

20. The process of preparing poly-β-hydroxybutyric acid from *Bacillus megaterium* which comprises inoculating *Bacillus megaterium* into a culture medium comprised of 240 g. glucose, 9 g. yeast extract, 600 ml. mineral solution and 12,000 ml. water, the mineral solution being composed of 10 g. $(NH_4)_2SO_4$, 10 g. $KH_2PO_4$, 18.9 g. $Na_2HPO_4 \cdot 7H_2O$, 2 g. $MgSO_4$, 0.2 g. $CaCl_2$, 0.06 g. $FeCl_3$ and 1000 ml. $H_2O$; continuously aerating the inoculated culture medium during the incubation period with filtered air at about room temperature during the incubation period, harvesting the bacterial cell mass; dispersing the bacterial cell mass in acetone to break up the bacterial cell walls and to remove lipids and water therefrom; separating the thus-treated bacterial mass and dispersing it in hot pyridine to extract poly-β-hydroxybutyric acid; separating the solution of polyester from the cell residue; adding ether to the solution of polyester to precipitate the polyester and recovering the polyester product.

No references cited.